United States Patent
D'Angelo et al.

(10) Patent No.: US 6,780,049 B1
(45) Date of Patent: Aug. 24, 2004

(54) CEILING FIXTURE LIGHT/FAN QUICK CONNECT AND RELEASE

(76) Inventors: Carlo Armond D'Angelo, 3268 Lower Mountain Rd., Sanborn, NY (US) 14132; Lisa Ann D'Angelo, 3268 Lower Mountain Rd., Sanborn, NY (US) 14132

(*) Notice: Subject to any disclaimer, the term of this patent is extended or adjusted under 35 U.S.C. 154(b) by 0 days.

(21) Appl. No.: 10/650,198

(22) Filed: Aug. 26, 2003

Related U.S. Application Data

(60) Provisional application No. 60/477,513, filed on Jun. 11, 2003.

(51) Int. Cl.[7] .............................................. H01R 13/66
(52) U.S. Cl. ...................... 439/537; 439/313; 439/314; 439/334; 439/92
(58) Field of Search ................................ 439/314, 527, 439/313, 334, 351, 361, 537, 92

(56) References Cited

U.S. PATENT DOCUMENTS

| | | | |
|---|---|---|---|
| 1,639,125 A | * 8/1927 | Benjamin | 439/313 |
| 2,300,487 A | * 11/1942 | Conteville | 439/345 |
| 3,985,417 A | * 10/1976 | Fenton | 439/334 |
| 4,637,673 A | * 1/1987 | Yang | 439/313 |
| 4,929,187 A | * 5/1990 | Hudson et al. | 439/334 |
| 4,952,157 A | * 8/1990 | Hudson et al. | 439/92 |
| 5,558,537 A | * 9/1996 | Su | 439/537 |
| 5,586,867 A | * 12/1996 | Mehlos | 417/45 |
| 6,146,191 A | * 11/2000 | Kerr et al. | 439/537 |
| 6,325,654 B1 | * 12/2001 | Kerr et al. | 439/313 |
| 6,464,524 B1 | * 10/2002 | Kerr et al. | 439/313 |
| 6,503,099 B2 | * 1/2003 | Kerr, Jr. | 439/537 |
| 2002/0163812 A1 | * 11/2002 | Tseng | 362/404 |

* cited by examiner

Primary Examiner—Javaid H. Nasri
(74) Attorney, Agent, or Firm—Donald W. Meeker

(57) ABSTRACT

A ceiling fan or light fixture hanging system that comprises a male and female electrical connector and ramp lock quick connection for installation of a ceiling fan or light fixture to an electric outlet box located on a ceiling.

4 Claims, 2 Drawing Sheets

CEILING FIXTURE LIGHT/FAN QUICK CONNECT AND RELEASE

CLAIM OF PROVISIONAL APPLICATION RIGHTS

This application claims the benefit of U.S. Provisional Patent Application No. 60/477,513, filed on Jun. 11, 2003.

BACKGROUND OF THE INVENTION

1. Field of the Invention

The present invention relates to a ceiling fan or light fixture hanging system and in particular to a male and female ramp lock quick connect electrical connection, which allows a quick, easy, and less cumbersome, installation of a ceiling fan or light fixture to an electric outlet box located on the ceiling.

2. Description of the Prior Art

Traditionally, ceiling fans have been installed by a laborious, time consuming and often cumbersome practice. The conventional ceiling plate is secured to an electric outlet box by passing the lead wires of the outlet box through a central circular opening in the ceiling plate. Mounting screws are passed through two elongated openings in the ceiling plate to threadingly engage with two threaded holes diagonally separated from each other on the periphery of the outlet box. Alternatively, wood screws are passed through the ceiling plate and the outlet box and into a wood stud which supports the outlet box. In either event, the screws are tightened until the ceiling plate is securely mounted on the outlet box.

The typical ceiling plate includes a hanging hook having a first portion which extends vertically downward from the ceiling plate at a location approximately one-half way between one end and the central circular opening. The hanging hook terminates in a second portion having a free end, which is bent back up towards the central opening of the ceiling plate.

When a typical ceiling fan assembly is mounted to the ceiling plate, the motor, fan blades and an optional light assembly are secured to a canopy by a down rod or hanger rod. The down rod passes through a central opening in the canopy with a ball mount located at an end of the down rod engaged by a periphery of the opening of the canopy. A radially inwardly extending prong projecting from the periphery of the opening of the canopy engages a slot in the ball mount to allow pivoting of the fan assembly with respect to the canopy.

The canopy includes at each of two opposite locations, a hole and an L-shaped groove. When assembled, the fan assembly is lifted by the canopy so that one hole on one side of the canopy is fitted through the free end of the ceiling hook. The fan assembly is thereby suspended from the ceiling hook.

The electrical lead wires from the ceiling plate are then connected to the lead wires from the fan motor. When the electrical connections are completed, a screw is installed in each of the two screw holes located on opposite sides of the ceiling plate.

The installer of the fan assembly, who is usually positioned at an elevated height by a ladder or some other means, must then lift the entire fan assembly and free the fan assembly from the ceiling plate by removing the canopy from engagement with the free end of the ceiling hook. The amount of allowable movement of the fan assembly is limited by the connection of the electrical wire leads. Therefore, only a small amount of movement of the fan assembly is possible before strain is placed on the connections of the wire leads.

The canopy and fan assembly are lifted until the L-shaped grooves on opposite sides of the canopy are fitted over the shanks of the screws secured in the opposite sides of the ceiling plate. The canopy is at first lifted vertically until the shank of each screw engages the bottom of the portion of the L-shaped groove, which is initiated at the uppermost edge of the canopy. The canopy and therefore the entire fan assembly is then twisted so that the shanks of the screws in the ceiling plate slide in the remaining portion of the L-shaped grooves in the canopy.

The canopy of the fan assembly is twisted until the holes at the opposite sides of the canopy are aligned with the two remaining screw holes in the opposite sides of the ceiling plate. A third and fourth screw are inserted, respectively, through the opposite sides of the canopy and into the ceiling plate to anchor the canopy and thus the entire fan assembly on the ceiling plate and suspend the fan from the ceiling.

Prior art patents have not adequately addressed the problem of providing a quick release ceiling electrical ceiling fixture.

U.S. Pat. No. 2,300,487, issued Nov. 3, 1942 to Conteville, discloses an outlet fitting for electric currents, which is composed of two half-parts. The first half-part is a fixed part that is rigidly attached to the ceiling or similar inaccessible position. The detachable second half-part is adapted to be attached to or detached from the fixed half of the device. Both the fixed part and the detachable part are equipped with electrical contacts, which maintain good electrical when the two half-parts are locked together. The contacts of the detachable part are spring pressed against the corresponding contacts of the fixed part. The detachable part may be have a lamp holder or a similar suspended fixture mounted directly therein. The two half-parts of the device lock together by means of a pin structure that protrudes from the detachable portion, which slides into and seats in a slot provided in the fixed portion, thereby engaging the electrical contacts.

U.S. Pat. No. 1,639,125, issued Agu. 16, 1927 to Benjamin, indicates an electrical connector device that provides the means to support a fixture in position with respect to a receptacle in such a manner that it can be readily connected and disconnected both electrically and mechanically.

U.S. Pat. No. 5,558,537, issued Sep. 24, 1996 to Su, provides a ceiling fixture mounting structure that includes a ceiling fixture holder fixed to the ceiling around the wire hole on the ceiling. The structure also includes a circular mounting plate detachably fastened to the ceiling fixture holder by swivel joint, which has a connecting block with a cut at the center. The structure further includes a ceiling fixture body fastened to the mounting plate by screws, wherein by matching the cut on the connecting block with a stop plate on the ceiling fixture holder, the mounting plate is accurately fastened to the ceiling fixture holder, causing the contact metal plates of on the connecting block respectively and positively disposed in contact with the contact metal plates on the ceiling fixture holder.

U.S. Pat. No. 4,952,157, issued Agu. 28, 1990 to Hudson, illustrates an electrical coupling device for detachably securing a fixture to an electrical outlet box, which comprises male and female interconnecting components. The fixture is connected to the male component where the male component is secured to the female component by rotating the male component. The male component has a plurality of catches. The male has a plurality of studs for insertion and engagement with the catches by way of rotational movement of the studs into the catches. The catches are spaced apart in a circular array at a first radius. The improvement comprises at least two spaced apart female resilient clips of electrically conductive metal. The clips are located in a circular pattern at a second radius on the female component. The male component has at least two spaced-apart contacts of electrically conductive metal. The contacts are located in a circular pattern at the second radius. The male contacts are in register with the clips when the studs are in register with the catches. Rotation of the male component to engage the studs with the catches simultaneously engages the contacts with the clips to depress the clip slightly to ensure electrical contact The electrical coupling device is characterized by minimal protrusion into the electrical junction box; direct mounting by means of a simple one-step rotation; and applicability to a wide range of fixtures and sizes of electrical outlet boxes; and direct mounting without the requirement of an outlet box.

U.S. Patent Application No. 20020163812, published Nov. 7, 2002 by Tseng, illustrates a fast assembling structure for ceiling fan lamp and ceiling fan, which includes a base tray and a lamp seat. The base tray has an upward extending tube. An inner wall of the tube is formed with two radially opposite slide channels axially passing through the tube and two radially opposite engaging notches. The top end of the tube is provided with a cap in which a wire-connecting disc is disposed and downward pushed by a resilient member. The lamp seat has an upward extending hollow post. A wire-connecting seat is connected with the top end of the post. A pin member is radially passed through the post near the top end thereof. Two ends of the pin member protrude out of the post. When the post is upward fitted into the tube, the pin member passes through the two slide channels. Thereafter, the post is rotated to aim the pin member at the engaging notches and the resilient member resiliently pushes the wire-connecting disc to press the post and make the pin member engaged and located in the engaging notches. At this time, the contacts of the wire-connecting seat electrically contact with the contacts of the wire-connecting disc.

U.S. Pat. No. 6,322,232, issued Nov. 27, 2001 to Oliver, claims a quick connect light fixture which may be used in conjunction with and attached to a ceiling fan, or alternatively may comprise a ceiling-mounted light fixture or a wall-mounted sconce. The light fixture includes an adapter plate, which may be mounted to a structure such as a substantially flat lower surface of a ceiling fan switch housing, with the structure varying with application, and an electrical connector secured to the plate. The fixture further includes an open-ended bracket and a second, mating electrical connector secured thereto. The plate includes a pair of flanges which are configured to define a channel and the bracket includes a pair of sidewalls having a first portion integral with a web separating the sidewalls and a second portion terminating in a lip. The lips of the bracket slidingly engage the flanges of the adapter plate with a distal portion of each lip being disposed within one of the channels defined by the adapter plate flanges, whereby the mating electrical connectors engage one another. The light fixture further includes a hollow rod threaded into the bracket at one end thereof A locking member is also threaded onto the hollow rod so that a locking force is exerted between the lips of the sidewalls of the bracket and the flanges of the adapter plate.

U.S. Pat. No. 6,027,310, issued Feb. 22, 2000 to Kerr, Jr., provides ceiling fans with easy installation features. Such a fans include an electrical quick connect device and an articulating fan blade assembly. The quick connect device includes a plug/receptacle configuration enabling the fan to easily connect to an electricity supply while providing the gravitational and rotational support required by the fan. The fan blade assembly includes a drive hub having a series of slots to receive the neck of a fan blade. The fan blade neck is secured in the slot in a fashion that allows for articulation of the blade relative to the fan or removal of the fan blade from the fan.

U.S. Pat. No. 6,146,191, issued Nov. 14, 2000 to Kerr, Jr., shows a ceiling fan with easy installation features, which includes a first plate attached to a ceiling junction box and a plug plate to be rotatably joined to the first plate and fixed in a final position by locking screws that pass through apertures in one plate and into bores in the other plate. The locking screws are usable to fix a fan bell to the plug plate. The plug plate includes slidably engageable flat contact strips. The plates include an initial orientation key for fitting into an oval opening and the first plate may include a spring biased shock protector for blocking access to live contacts when the plates are not connected. The plates may be formed in slidably adjustable sections for use with different size fan bells.

U.S. Pat. No. 6,325,654, issued Dec. 4, 2001 to Kerr, Jr., describes a quick connect device for mounting a suspended electrical fixture to an overhead support and electrically connecting the fixture to an electrical supply. The mounting device includes a mounting plate, a coupling plate, an electrical receptacle and an electrical plug. The device also includes a cap for covering receptacle terminals and a ball and socket support for the fixture. The mounting plate attaches to a junction box and contains the receptacle, which connects to an electrical supply. The coupling plate attaches to an electrical fixture and rotatably engages the receiving plate. The plug is rotatably secured to the coupling plate and includes a plurality of electrical conductors and a skirt surrounding the conductors. The receptacle includes a body having a plurality of sockets for receiving the conductors and an outer periphery shaped to slidably engage the inner periphery of the plug skirt. Rotation prevention screws may be used to avoid plate separation.

U.S. Pat. No. 6,464,524, issued Oct. 15, 2002 to Kerr, Jr., discloses ceiling fans with easy installation features. Such a fans include an electrical quick connect device and an articulating fan blade assembly. The quick connect device includes a plug/receptacle configuration enabling the fan to easily connect to an electricity supply while providing the gravitational and rotational support required by the fan. The fan blade assembly includes a drive hub having a series of slots to receive the neck of a fan blade. The fan blade neck is secured in the slot in a fashion that allows for articulation of the blade relative to the fan or removal of the fan blade from the fan.

U.S. Pat. No. 6,503,099, issued Jan. 7, 2003 to Kerr, Jr., indicates a ceiling fan or light fixture that is provided with a sliding support member that slides horizontally into a support channel attached to a ceiling box. An electrical plug and receptacle attached to the two support members automatically mate as the two support members are slid together. A bell is then raised to cover the two support members and prevent them from sliding apart.

U.S. Pat. No. 4,637,673, issued Jan. 20, 1987 to Yang, puts forth an easily disassemblable separate ceiling fan switch box structure, which makes the upper cover and the lower housing body of the switch box locked and joined. The upper cover can join to a wire distribution receptacle, which connects to the wires of the elements of the switch device. The said wire distribution receptacle can couple with the wire distribution receptacle connected to the wires of the ceiling fan motor and then a fixing sleeve ring fixes and joins them. Further, an annular or frame-shaped PC board can also be installed in the inner part of the lower housing body to allow the said elements and their wire distribution receptacle to be directly installed thereon, hereby making the ceiling fan switch box structure simplified and compact for convenient disassembly or assembly.

U.S. Pat. No. 5,586,867, issued Dec. 24, 1996 to Mehlos, concerns a ceiling mounted fan unit that includes a lamp based connector adapted to be threaded into a threaded lamp socket to releasably mount the fan to the ceiling. The fan unit is a lightweight unit including an integrated motor drive, which is coupled to a rotating fan blade support structure by a speed reducing torque increasing coupling unit. The coupling unit may include a belt drive, a friction drive and a direct gear drive. A releasable housing is secured to the fan unit to permit coordinated decorative fan blade with the room. An auxiliary support structure can be incorporated into the fan unit to physically engage a wall socket to supplement the physical support. An electrical control circuit incorporates various safety controls to prevent minimized hazards as a result of the drive system of the electrical system. The fan blades are releasably connected to the support to permit changes in the decorative characteristic of the fan blades.

U.S. Pat. No. 4,929,187, issued May 29, 1990 to Hudson, is for an electrical coupling device for detachably securing a fixture to an electrical outlet box, which comprises male and female interconnecting components. The fixture is connected to the male component where the male component is secured to the female component by rotating the male component. The male component has a plurality of catches. The male has a plurality of studs for insertion and engagement with the catches by way of rotational movement of the studs into the catches. The catches are spaced apart in a circular array at a first radius. The improvement comprises at least two spaced apart female resilient clips of electrically conductive metal. The clips are located in a circular pattern at a second radius on the female component. The male component has at least two spaced-apart contacts of electically conductive metal. The contacts are located in a circular pattern at the second radius. The male contacts are in register with the clips when the studs are in register with catches. Rotation of the male component to engage the studs with the catches simultaneously engages the contacts with the clips to depress the clip slightly to ensure electrical contact. The electrical coupling device is characterized by minimal protrusion into the electrical junction box; direct mounting by means of a simple one-step rotation; and applicability to a wide range of fixtures junction boxes; and direct mounting without the requirement of a junction box.

U.S. Pat. No. 3,985,417, issued Oct. 12, 1976 to Fenton, claims a coupling device for coupling releasably an electrical fixture to electrical outlet adjacent building surface. The device has a female assembly connected to electrical outlet box and power, the assembly has three female supporting lugs with engagement means. Respective electrical contacts are secured adjacent each lug and spaced from lug to provide gap between the lug and contact. A male assembly is connected to the fixture and has three complementary male supporting lugs with engagement means complementary to the respective engagement means of the female lug. Each male lug has contacts extending along upper surface thereof to fit between the female lug and respective contact. When the male assembly is inserted into the female assembly and rotated relative thereto, engagement means of each lug engages the complementary engagement means of opposite lug and respective contacts are forced into and maintain engagement so as to conduct electricity. The engagement means essentially prevents accidental rotation leading to disconnection. The female lugs shield live contact in a disconnected fixture, thus reducing electrical shock hazard.

What is needed is a quick connect electrical connection, which allows a quick, easy, and less cumbersome, installation of a ceiling fan or light fixture to an electric outlet box located on the ceiling.

SUMMARY OF THE INVENTION

An object of the present invention is to provide a male and female ramp lock quick connect electrical connection, which allows a quick, easy, and less cumbersome, installation and removal (for cleaning) of a ceiling fan or light fixture to an electric outlet box located on the ceiling.

Another object of the present invention is to provide a fixture fastening assembly that comprises ramped grooves and drop lock notch in one half and mating protruding tabs in the other half, which prevent the accidental release of the fixture.

One more object of the present invention to provide a quick release ceiling fixture that is inexpensive to manufacture.

In brief, a quick connect/quick release ceiling electrical connection system that allows a quick, easy, and less cumbersome, installation of a ceiling fan or light fixture to an electric outlet box located on the ceiling. The connection system comprises a top canopy attachable to a ceiling electrical utility box and a bottom canopy supporting a hanging electrical fixture, which may be a hanging light fixture, a hanging fan fixture or a combination hanging light fixture and fan.

The top canopy comprises one half of a male-female electrical connector mounted on a normally extended spring in the top canopy. The electrical connector has a downwardly facing interconnecting portion and an upwardly facing wired connection to a power supply. The top canopy also has a downwardly facing circular fixture receiving opening. The fixture receiving opening has a pair of upwardly ramped grooves on opposing sides of the fixture receiving opening, each of the ramped grooves terminate in a downwardly extending drop lock notch.

The bottom canopy supports a hanging electrical fixture and comprises a circular connecting ring that has one pair of protruding tabs on opposing sides of the connecting ring. The protruding tabs engage the ramped grooves and the drop lock notch of the top canopy to interconnect the two canopies. The other half of the male-female electrical connector is attached to the mating bottom canopy and has an upwardly facing interconnecting portion protruding above the canopy so that the interconnecting portions of the electrical connectors mutually engage and interconnect prior to contact of the protruding tabs with the ramped grooves. The top canopy also comprises a spring that allows the two halves of the male-female electrical connectors to engage and move upwardly while the tabs ride in the ramped grooves. The bottom canopy further comprises a downwardly facing wired connection to the electrical fixture so that attaching the two canopies together automatically connects the electrical fixture to the power supply.

An advantage of the present invention is that it is less cumbersome and safer to install.

Another advantage of the present invention is that it is quick and easy to install and remove.

An additional advantage of the present invention is that the fixture is locked into place when installed.

One more advantage of the present invention is that once installed, fixtures may be changed easily.

Yet another advantage of the present invention is that it is inexpensive to manufacture.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
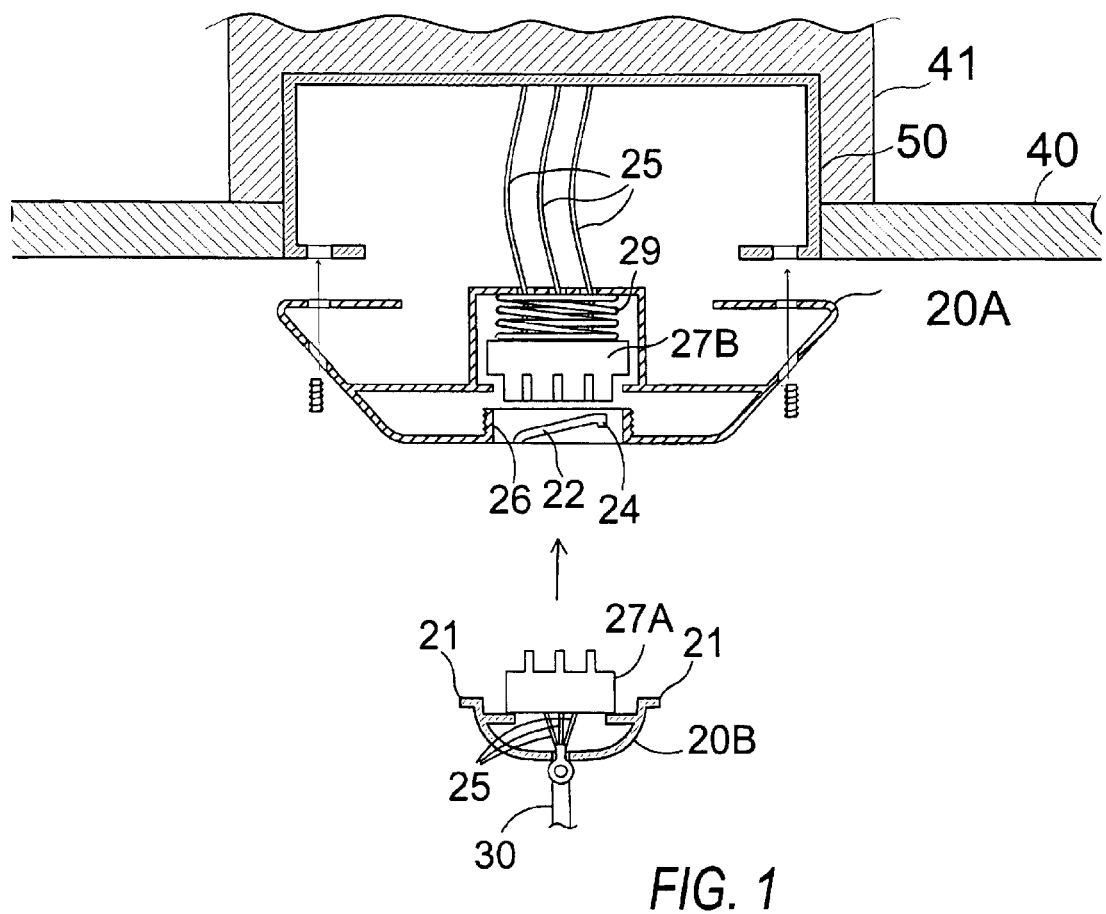
FIG. 1 is a cross-sectional view of the top and bottom canopies of the invention aligned for interconnection to each other and to the electrical utility box.
Figure 2:
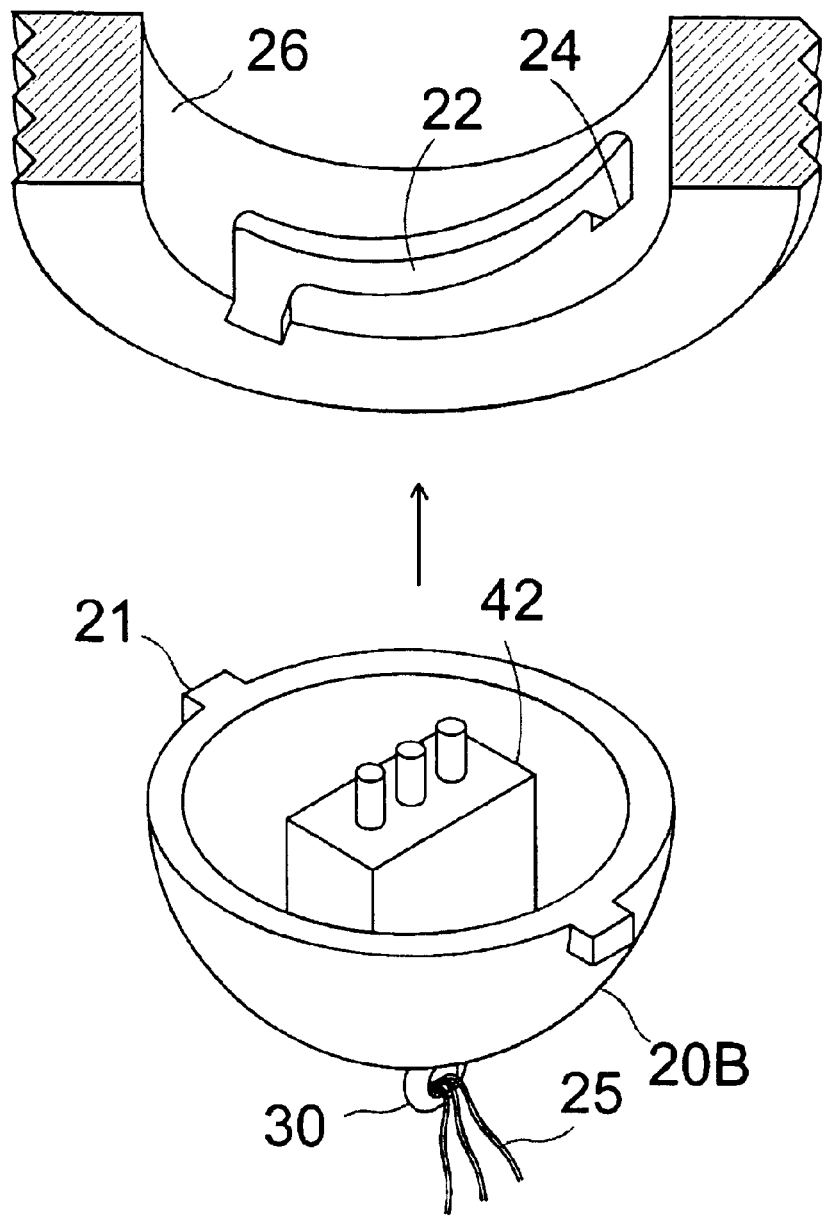
FIG. 2 is a broken perspective view in partial section of the circular ring and protruding tabs of the bottom canopy and one of the ramped grooves and drop lock notches of the top canopy.

In FIGS. 1–2, a quick connect/quick release ceiling electrical connection system 20 that allows a quick, easy, and less cumbersome, installation and removal of a ceiling fan or light fixture (not shown) to an electric outlet box 50 located on the ceiling 40. The connection system 20 comprises a top canopy 20A that is attached to a ceiling 40 electrical utility box 50. The top canopy 20A comprises one half of a male-female electrical connector 27B mounted on a normally extended spring 28 in the top canopy 20A. The electrical connector 27B has a downwardly facing interconnecting portion 23B and an upwardly facing wired connection to a power supply 60. The top canopy 20A also has a downwardly facing circular fixture receiving opening 26. The fixture receiving opening 26 has a pair of upwardly ramped grooves 22 on opposing sides of the fixture receiving opening 26, each of the ramped grooves 22 terminate in a downwardly extending drop lock notch 24.

The connection system 20 further comprises a bottom canopy 20B that supports a hanging electrical fixture (not shown), which may be a hanging light fixture, a hanging fan fixture or a combination hanging light fixture and fan. The bottom canopy 20B comprises a circular connecting ring 26B that has a pair of protruding tabs 21 on opposing sides of the connecting ring 26B. The protruding tabs 21 engage the ramped grooves 22 and the drop lock notch 24 of the top canopy 20A to interconnect the two canopies 20A and 20B. The other half of the male-female electrical connector 27A is attached to the mating bottom canopy 20B and has an upwardly facing interconnecting portion 23A that protrudes above the canopy 20B so that the interconnecting portions 23A and 23B of the electrical connectors 27 A and 27B mutually engage and interconnect prior to contact of the protruding tabs 21 with the ramped grooves 22. The top canopy 20B also comprises a spring 29 that allows the two halves of the male-female electrical connectors 27A and 27B to engage and move upwardly while the tabs 21 ride in the ramped grooves 22. The bottom canopy 20B further comprises a downwardly facing wired connection 30 to the electrical fixture (not shown) so that attaching the two canopies 20A and 20B together automatically connects the electrical fixture to the power supply 60.

In practice, the wires 25 of an existing electrical utility box 50 would be connected to the upwardly facing side of the female electrical connector 27B in the top canopy 20A, as shown in FIG. 1. The top canopy 20A would then be screwed to the electrical utility box 50 so that the bottom of the top canopy 20A would be flush with the ceiling 40. The user would then engage the male electrical connector 27A to the female connector 27B of the top canopy and simultaneously insert the protruding tabs 21 of the bottom canopy 20B into the ramped grooves 22 of the top canopy 20A and twist the bottom canopy 20B until the protruding tabs 21 lock into the drop lock notch 24, thereby interconnecting the two canopies 20A and 20B.

It is understood that the preceding description is given merely by way of illustration and not in limitation of the invention and that various modifications may be made thereto without departing from the spirit of the invention as claimed.

What is claimed is:

1. A quick connect/quick release ceiling electrical connection system which allows a quick, easy, and less cumbersome, installation of a ceiling fan or light fixture to an electric outlet box located on a ceiling, the connection system comprising:

a top canopy attachable to a ceiling electrical utility box, the top canopy comprising one half of a male-female electrical connector mounted on a normally extended spring in the top canopy, the electrical connector having a downwardly facing interconnecting portion and an upwardly facing wired connection to a power supply, and a downwardly facing circular fixture receiving opening in the top canopy, the fixture receiving opening having at least a pair of upwardly ramped grooves on opposing sides of the fixture receiving opening, each of the ramped grooves terminating in a downwardly extending drop lock notch;

a bottom canopy supporting a hanging electrical fixture, the bottom canopy comprising a circular connecting ring having at least one pair of protruding tabs on opposing sides of the connecting ring, the protruding tabs capable of engaging the ramped grooves and the drop lock notch of the top canopy to interconnect the two canopies, and the other half of the male-female electrical connector attached to the mating canopy with an upwardly facing interconnecting portion protruding above the bottom canopy so that the interconnecting portions of the electrical connector are capable of mutually engaging and interconnecting prior to contact of the protruding tabs with the ramped grooves and the spring capable of allowing the two halves of the male-female electrical connectors to engage and move upwardly while the tabs ride in the ramped grooves, and a downwardly facing wired connection to the electrical fixture so that attaching the two canopies together automatically connects the electrical fixture to the power supply.

2. The connection system of claim 1 wherein the electrical fixture is a hanging light fixture.

3. The connection system of claim 1 wherein the electrical fixture is a hanging fan fixture.

4. The connection system of claim 1 wherein the electrical fixture is a combination hanging light fixture and fan.

* * * * *